US010794309B2

(12) United States Patent
Ruhland et al.

(10) Patent No.: US 10,794,309 B2
(45) Date of Patent: Oct. 6, 2020

(54) METHODS AND SYSTEMS FOR A PARTICULATE FILTER (71) Applicant: Ford Global Technologies, LLC, Dearborn, MI (US)

(72) Inventors: Helmut Hans Ruhland, Eschweiler (DE); Brendan Patrick Carberry, Aachen (DE); Jan Linsel, Cologne (DE); Christoph Boerensen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 16/103,792

(22) Filed: Aug. 14, 2018

(65) Prior Publication Data
US 2019/0112994 A1    Apr. 18, 2019

(30) Foreign Application Priority Data

Oct. 18, 2017  (DE) .......... 10 2017 218 572
Oct. 18, 2017  (DE) .......... 10 2017 218 573
Oct. 18, 2017  (DE) .......... 10 2017 218 574

(51) Int. Cl.
*F01N 3/021*   (2006.01)
*F02D 41/02*   (2006.01)
(Continued)

(52) U.S. Cl.
CPC .......... *F02D 41/0235* (2013.01); *B01D 53/94* (2013.01); *F01N 3/021* (2013.01);
(Continued)

(58) Field of Classification Search
CPC ............. F01N 2410/06; F01N 2430/04; F01N 2610/03; B01D 37/02; B01D 2239/0478; B01D 2273/12
See application file for complete search history.

(56) References Cited

U.S. PATENT DOCUMENTS 1,825,330 A    9/1931  Baker
4,046,690 A    9/1977  Rodgers et al.
(Continued)

FOREIGN PATENT DOCUMENTS

DE        3541372 A1    6/1986
DE  102009049624 A1    4/2011
(Continued)

OTHER PUBLICATIONS

Tsuneyoshi, K. et al., "Effects of Washcoat on Initial PM Filtration Efficiency and Pressure Drop in SiC DPF," Proceedings of the SAE 2011 World Congress & Exhibition, Apr. 12, 2011, Detroit, Michigan, 14 pages.
(Continued)

*Primary Examiner* — Jonathan R Matthias
(74) *Attorney, Agent, or Firm* — Geoffrey Brumbaugh; McCoy Russell LLP (57) ABSTRACT Methods and systems are provided for a particulate filter comprising a pretreatment. In one example, a method may include applying a pretreatment to an unused particulate filter, wherein the particulate filter is subjected to incomplete oxidation conditions following application of the pretreatment.

18 Claims, 6 Drawing Sheets (51) Int. Cl.
  *B01D 53/94*  (2006.01)
  *F01N 3/025*  (2006.01)
  *F01N 3/035*  (2006.01)
  *F02D 41/14*  (2006.01)

(52) U.S. Cl.
  CPC ...... *F01N 3/0256* (2013.01); *B01D 2255/915* (2013.01); *B01D 2255/9155* (2013.01); *F01N 3/035* (2013.01); *F01N 2430/06* (2013.01); *F01N 2610/00* (2013.01); *F01N 2900/1406* (2013.01); *F02D 41/029* (2013.01); *F02D 41/1454* (2013.01); *F02D 41/1475* (2013.01)

(56) References Cited

U.S. PATENT DOCUMENTS

| | | |
|---|---|---|
| 4,510,055 A | 4/1985 | White |
| 6,942,708 B2 | 9/2005 | Peter et al. |
| 7,266,943 B2 | 9/2007 | Kammel |
| 7,524,360 B2 | 4/2009 | Cheng |
| 8,464,520 B2 | 6/2013 | Chen et al. |
| 8,889,221 B2 | 11/2014 | Sappok et al. |
| 8,926,926 B2 | 1/2015 | Koch et al. |
| 8,980,187 B2 | 3/2015 | Harris |
| 9,027,333 B2 | 5/2015 | Neely et al. |
| 9,051,858 B2 | 6/2015 | Silver et al. |
| 2004/0065078 A1 | 4/2004 | Schafer-Sindlinger et al. |
| 2008/0307776 A1 | 12/2008 | Gonze et al. |
| 2010/0266461 A1* | 10/2010 | Sappok .............. B01D 39/2093 422/177 |
| 2015/0000254 A1 | 1/2015 | Neely et al. |
| 2017/0101916 A1 | 4/2017 | Klaas et al. |

FOREIGN PATENT DOCUMENTS

| | | |
|---|---|---|
| DE | 102016103735 A1 | 9/2017 |
| JP | S60248212 A | 12/1985 |

OTHER PUBLICATIONS

Mokhri, M. et al., "Soot Filtration Recent Simulation Analysis in Diesel Particulate Filter (DFP)," Procedia Engineering, vol. 41, No. 1, Dec. 2012, 6 pages.

Sappok, A., "Ash Accumulation in Diesel Particulate Filters," DieselNet Website, Available Online at https://www.dieselnet.com/tech/dpf_ash.php, Available as Early as Jan. 2013, 6 pages.

\* cited by examiner

METHODS AND SYSTEMS FOR A PARTICULATE FILTER

CROSS REFERENCE TO RELATED APPLICATIONS

This application claims priority to German Patent Application No. 102017218573.2, filed Oct. 18, 2017, German Patent Application No. 102017218572.4, filed Oct. 18, 2017, and German Patent Application No. 102017218574.0, filed Oct. 18, 2017. The entire contents of the above-referenced applications are hereby incorporated by reference in their entirety for all purposes.

FIELD

The present description relates generally to an engine having a particulate filter.

BACKGROUND/SUMMARY

Particulate filters are increasingly being used in the exhaust gas lines of both diesel and spark-ignition engines to filter out soot particles from an exhaust gas stream thereby decreasing emissions. The particulate filter may be regenerated at certain time intervals, which may include actively or passively increasing an exhaust gas temperature to combust the captured soot particles. Ash deposits may accumulate on the particulate filter surface as a result of the regeneration.

Other attempts to address emissions include preloading a particulate filter with a minimum load. One example approach is shown by Neely et al. in U.S. Pat. No. 9,027,333. Therein, it is described that particulate filters with a certain degree of soot loading more effectively prevent the emission of hydrocarbons during an engine cold start than do unloaded particulate filters. It is therefore proposed to ensure a certain minimum soot loading of the particulate filter to raise filter efficiency. This can be achieved by controlling particulate filter regeneration such that not all the soot particles are combusted during regeneration, but instead a certain minimum loading remains in the particulate filter. This may also be referred to as a partial regeneration.

However, the inventors herein have recognized potential issues with such systems. As one example, using this method, the minimum loading can only be achieved after a certain period of operation of the engine since soot particles are only formed during engine operation. On initial startup of the engine, however, it remains at the lower filter efficiency. In addition, soot loading results in a severe buildup in exhaust gas back-pressure which may lead to raised fuel consumption and furthermore raises the probability of knocking in spark-ignition engines under heavy load. Thus, a way in which sufficient filter performance can be ensured right from initial startup of an engine is still desired. It would additionally be desirable to reduce the buildup of exhaust gas back-pressure and largely avoid the disadvantages associated therewith.

In one example, the issues described above may be addressed by a method for manufacturing a particulate filter, applying a hydrocarbon-containing composition onto at least a portion of the particulate filter, arranging the particulate filter in an exhaust passage of a vehicle, and adjusting engine operating parameters during a first combustion of an engine of the vehicle to incompletely oxidize the hydrocarbon-containing composition. In this way, a soot layer may form more quickly on the particulate filter, thereby decreasing a duration of a breaking-in period.

As one example, pores of the particulate filter may be sized slightly above a desired pore size in anticipation of the pretreatment being partially oxidized. A soot layer may form once the pretreatment is oxidized, which may decrease a pore size of the pores to the desired pore size. By doing this, larger pores may be utilized, which may decrease drawbacks of higher exhaust gas backpressures.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for using particulate filters in the exhaust gas line of spark-ignition engines, the filter efficiency (e.g., the ratio of filtered-out particles to all the particles of a specific size which are present) distinctly increases after a certain initial period of operation (breaking-in period) which for example in spark-ignition engines corresponds to a distance traveled of approx. 3000 km. This is attributable to the formation of a soot layer or filter cake, formed from the soot particles present in the exhaust gas stream, on the surface of the particulate filter. Said another way, newly manufactured vehicles which have not been driven more than about 3000 km may not comprise a sufficient soot layer or filter cake formed on the particulate filter. As such, particulate filters of newly manufactured vehicles may function at less than a desired filter efficiency, resulting in increased emissions.

In order to ensure that particulate pollutants are sufficiently filtered out right from initial startup of an engine having a particulate filter, it may be desired for a new particulate filter to comprise a smaller pore size to take advantage of a smaller soot layer, thereby decreasing the breaking-in period. This may be, however, disadvantageous after a certain period of operation because the combination of a small pore size and the developing soot layer further raises the exhaust gas back-pressure, so magnifying the associated disadvantageous effects explained above.

After completion of the breaking-in time, a distinctly larger pore size may be selected without any significant reduction in filter efficiency, since the layer containing soot and/or ash which has formed now likewise contributes to filtration.

As such, the present disclosure relates to manufacture and use a particulate filter, the porosity of which is tailored to the conditions after completion of the breaking-in period.

However, in order to ensure sufficient filter efficiency also during the breaking-in period, it is proposed to coat the surface of the unused particulate filter with a hydrocarbon-containing composition from which soot is then formed by means of incomplete oxidation. To this end, the hydrocarbon-containing composition may for example be incompletely combusted during the first operation of the internal combustion engine. The soot formed additionally contributes to filtering, so raising filter efficiency.

A method according to the disclosure for pretreating a particulate filter comprises applying a hydrocarbon-containing composition onto a surface of the particulate filter and subsequently forming soot on the surface of the particulate filter via incomplete oxidation of the hydrocarbon-containing composition. The incomplete oxidation here relates to the carbon of the hydrocarbon-containing composition. The formation of soot on the surface of the particulate filter loads the particulate filter with soot.

The particulate filter may be, for example, a wall-flow filter or a partial flow filter. The particulate filter may comprise filter walls of different porous materials, such as for example ceramics or metals, and may be arranged in a housing. The particulate filter may be provided with a catalytic coating, for example a coating for selective catalytic reduction, for oxidation of carbon monoxide and/or hydrocarbons or for a three-way catalyst. The particulate filter may for example be used for post-treating exhaust gases from an internal combustion engine.

The particulate filter surface may be defined as a region which comes into contact with the exhaust gas stream when the particulate filter is arranged in the exhaust gas line. Internal surfaces, such as for example the surface of pores of the particulate filter, are accordingly also included as the particulate filter surface. Soot may accumulate on at least a portion of the particulate filter surface.

Soot may be defined as a composition which arises for example on incomplete oxidation, in particular incomplete combustion, of the hydrocarbon-containing composition. Soot may for example comprise carbon in a proportion of between 80 and 99.5 wt. % and furthermore sulfates, condensed hydrocarbons and/or ash.

Formation of the soot enables the use of a particulate filter with a larger pore size, such that the exhaust gas back-pressure is low and minimally increases over the course of use of the particulate filter, but in any event less than when a particulate filter with a smaller pore size is used. In this way, fuel consumption can be lowered and the tendency to knock reduced.

The soot which forms as a result of the pretreatment comprising the hydrocarbon-containing composition may allow the particulate filter to capture a desired amount of soot and/or operate at a desired particulate filter efficiency during a breaking-in period where other particulate filters that do not comprise the pretreatment may function at less than the desired particulate filter efficiency.

The method according to the disclosure is used for pretreating a newly manufactured particulate filter, which has not yet been used as intended. In other words, the particulate filter is not put to its intended use until the hydrocarbon-containing composition has been applied. That is to say, the pretreatment comprising the hydrocarbon-containing composition is applied to a particulate filter which is not and has not received exhaust gas. As such, the particulate filter has not yet filtered or contacted any hydrocarbon-containing compositions outside of compositions used during the manufacturing process.

For example, the hydrocarbon-containing composition can be applied before the first use of the particulate filter in an exhaust gas line of an internal combustion engine for filtering out particles from an internal combustion engine exhaust gas stream flowing in the exhaust gas line. The soot may likewise be formed before the start of intended use or simultaneously with the start of its intended use.

According to various variant embodiments, incomplete oxidation, for example incomplete combustion, can proceed after the particulate filter has been positioned in the exhaust gas line of an internal combustion engine.

In this way, incomplete oxidation may be completed using the devices of the exhaust gas line. For example, a gas with an oxidizing action (e.g., oxygen) can be supplied to the particulate filter via the exhaust gas line and gaseous reaction products discharged via the exhaust gas line. The hydrocarbon-containing composition can optionally also be applied onto a surface of the particulate filter after the particulate filter has been positioned in the exhaust gas line. The application of the hydrocarbon-containing composition applied to the particulate filter already arranged in the exhaust gas line may include injecting the hydrocarbon-containing composition directly onto a surface of the particulate filter.

According to various variant embodiments, the hydrocarbon-containing composition can be incompletely oxidized by supplying an oxygen-containing gas stream. As a consequence, the hydrocarbon-containing composition reacts to yield carbon and water and optionally secondary products such as hydrocarbons and/or carbon monoxide.

An oxygen-containing exhaust gas stream from an internal combustion engine may for example be supplied as an oxygen-containing gas stream. To this end, the combustion air ratio of the internal combustion engine may be adjusted such that a slight excess of oxygen is present which is used for the incomplete oxidation of the hydrocarbon-containing composition. The supplied quantity of oxygen may be adjusted such that oxidation proceeds incompletely, since otherwise the carbon of the hydrocarbon-containing connection is converted into carbon dioxide instead of soot.

For example, in an internal combustion engine operated stoichiometrically or substoichiometrically with a combustion air ratio of $\lambda \leq 1$ during coasting phases, it is possible to convey oxygen through the exhaust gas line which can be used for incomplete oxidation of the hydrocarbon-containing composition. Complete oxidation can here be prevented by the extreme dissipation of heat in the particulate filter. In addition, the oxygen supply during coasting can be restricted in such a manner that only incomplete oxidation takes place.

It is additionally possible, as part of a breaking-in calibration, to run the internal combustion engine lean during initial operation, for example during the first kilometer, i.e. with a combustion air ratio of $\lambda > 1$, such that incomplete oxidation of the hydrocarbon-containing composition is enabled or facilitated.

Advantageously, incomplete oxidation can therefore proceed with startup of the particulate filter of the internal combustion engine by supplying the exhaust gas stream of the internal combustion engine to the particulate filter previously provided with the hydrocarbon-containing composition.

According to further variant embodiments, the hydrocarbon-containing composition can be applied before the particulate filter is positioned in the exhaust gas line of the internal combustion engine. In this way, greater flexibility with regard to the application of the hydrocarbon-containing composition can be achieved. The latter may, for example, be applied during production of the particulate filter or when it is fitted into a housing.

According to various variant embodiments, the method may furthermore comprise a determination of an optimum pore size and/or pore size distribution for the particulate filter for a point in time after completion of a breaking-in period of an internal combustion engine, in the exhaust gas line of which the particulate filter is to be arranged, wherein soot formation proceeds in such a manner that the soot-loaded particulate filter has the optimum pore size and/or pore size distribution.

In other words, it is initially ascertained, for example by simulations known to a person skilled in the art or appropriate testing with a particulate filter of like construction, which pore size and/or pore size distribution is more favorable for the specific particulate filter after completion of the breaking-in period. Said another way, pore size and/or pore size distribution the particulate filter may increase efficiency as high as possible without an excessive rise in exhaust gas back-pressure. The tolerable exhaust gas back-pressure may be dependent on one or more of a number of cylinders, a combustion process used, and the like.

On the basis of this optimum pore size and/or pore size distribution, the soot is then formed on the particulate filter surface in such a manner that said optimum pore size and/or pore size distribution is present right from the first intended use or before further intended use if the soot is formed simultaneously with the start of intended use. In other words, the pores of the particulate filter are reduced in size by the formation of the soot in such a manner that the optimum pore size and/or pore size distribution is established. To this end, the quantity of soot to be formed, the particle size of the soot and/or the particle size distribution of the soot can be varied as desired.

In this way, an optimum pore size and/or pore size distribution can be ensured right from the breaking-in period of the internal combustion engine, such that particulate pollutants can be effectively removed from the exhaust gas stream right from this stage.

According to further variant embodiments, organic compounds which can readily be applied in layers can, for example, be used as hydrocarbon-containing compositions. One possible example are synthetic resins which can be applied onto the surface of the particulate filter in the form of dispersions, as are for example used for priming porous surfaces such as for example masonry prior to actual coating. Water may, for example, be used as the dispersant, such that an aqueous synthetic resin dispersion is obtained.

In some examples, synthetic resin dispersions may comprise finely divided synthetic resin particles which, after removal of the dispersant, for example by drying, may be deposited as a layer on the surface of the particulate filter. The porosity of this layer can be adjusted by modifying the characteristics of the dispersion, for example solids content, particle size or particle size distribution. The deposited synthetic resin particles may then be converted at least in part into soot via incomplete oxidation. Synthetic resins may be defined as resins, for example alkyd or acrylic resins, synthetically produced by polymerization, polyaddition or polycondensation reactions.

In some embodiments, additionally or alternatively, the particulate filter may be a diesel particulate filter or a spark-ignition fuel particulate filter, for example a particulate filter for combustion engines operated with motor gasoline. Since the particulate emissions from spark-ignition engines may be lower than those from diesel engines, it may take longer to build up a filter cake which results in sufficient filtration, therefore elongating the breaking-in period. The method according to the present disclosure therefore results, in particular for spark-ignition fuel particulate filters, in an increase in filter performance from the outset.

A particulate filter according to the disclosure has a surface where at least a portion of the surface comprises a hydrocarbon-containing composition.

The hydrocarbon-containing composition may be incompletely oxidized, for example incompletely combusted, to form soot. The soot layer may contribute to the filtration effect of the particulate filter and can raise filter efficiency. A larger pore size can therefore be selected for the particulate filter, such that the exhaust gas back-pressure can be reduced and fuel saved.

This particulate filter may for example be produced as described above in relation to the method according to the disclosure by applying a hydrocarbon-containing composition onto a surface of the particulate filter. The above explanations of the method according to the disclosure therefore also serve to describe the particulate filter according to the disclosure. The advantages of the particulate filter according to the disclosure correspond to those of the method according to the disclosure and the corresponding variant embodiments thereof.

The particulate filter according to the disclosure may for example be or have been arranged in the exhaust gas line of an internal combustion engine and be used for post-treating an exhaust gas stream produced by the internal combustion engine, i.e. for filtering out particulate constituents from the exhaust gas stream.

According to various variant embodiments, the hydrocarbon-containing composition may be formed and arranged on the surface of the particulate filter in such a manner that, after incomplete oxidation of the hydrocarbon-containing composition, the particulate filter has an optimum pore size and/or pore size distribution for a point in time after completion of a breaking-in period of an internal combustion engine, in the exhaust gas line of which the particulate filter is to be arranged.

In other words, it is initially ascertained, for example by simulations known to a person skilled in the art or appropriate testing with a particulate filter of like construction, which pore size and/or pore size distribution is more favorable for the specific particulate filter after completion of the breaking-in period. Said another way, pore size and/or pore size distribution the particulate filter may increase efficiency as high as possible without an excessive rise in exhaust gas back-pressure. The tolerable exhaust gas back-pressure may be dependent on one or more of a number of cylinders, a combustion process used, and the like.

On the basis of this optimum pore size and/or pore size distribution, the soot is then formed on the particulate filter surface in such a manner that said optimum pore size and/or pore size distribution is present right from the first intended use or before further intended use if the soot is formed simultaneously with the start of intended use. In other words, the pores of the particulate filter are reduced in size by the formation of the soot in such a manner that the optimum pore size and/or pore size distribution is established. To this end, the quantity of soot to be formed, the particle size of the soot and/or the particle size distribution of the soot can be varied as desired.

In some examples, additionally or alternatively, the carbon-containing composition may be a synthetic resin.

In some examples, additionally or alternatively, the particulate filter may take the form of a diesel particulate filter or spark-ignition fuel particulate filter.

An engine arrangement according to the disclosure comprises an internal combustion engine having an exhaust gas line for receiving an exhaust gas stream produced by the internal combustion engine, wherein a particulate filter according to the above description is arranged in the exhaust gas line.

The engine arrangement can be arranged in a vehicle, wherein a vehicle may be defined as any mobile means of transport, i.e. both a ground vehicle as well as a water craft or aircraft, for example an automobile. In one example, the engine arrangement is in a hybrid vehicle, such as the vehicle of FIG. 1. Since the statutory regulations relating to the admissible emissions of atmospheric pollutants during operation of a vehicle with an internal combustion engine are becoming increasingly stringent, i.e. the limit values to be complied with are being reduced, the invention is particularly advantageous in this field since, firstly, improved filtering out of particulate constituents from the exhaust gas stream is enabled right from the breaking-in period. Secondly, the pore size and/or pore size distribution can be optimized for a situation after completion of the breaking-in period, such that the problems brought about by an excessively high exhaust gas back-pressure, such as for example raised fuel consumption, can be minimized.

Figure 1:
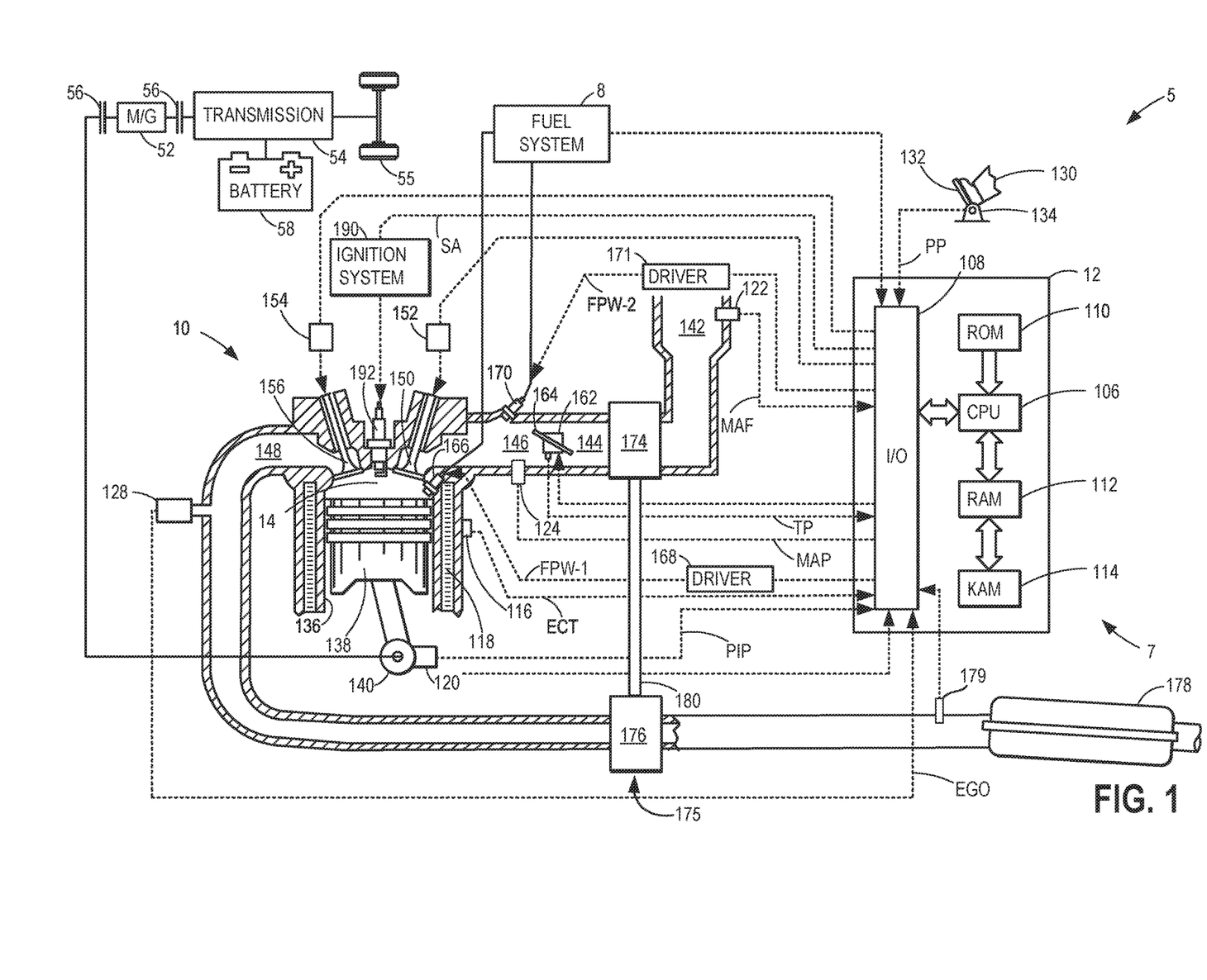
FIG. 1 shows an engine of a hybrid vehicle.
Figure 2:
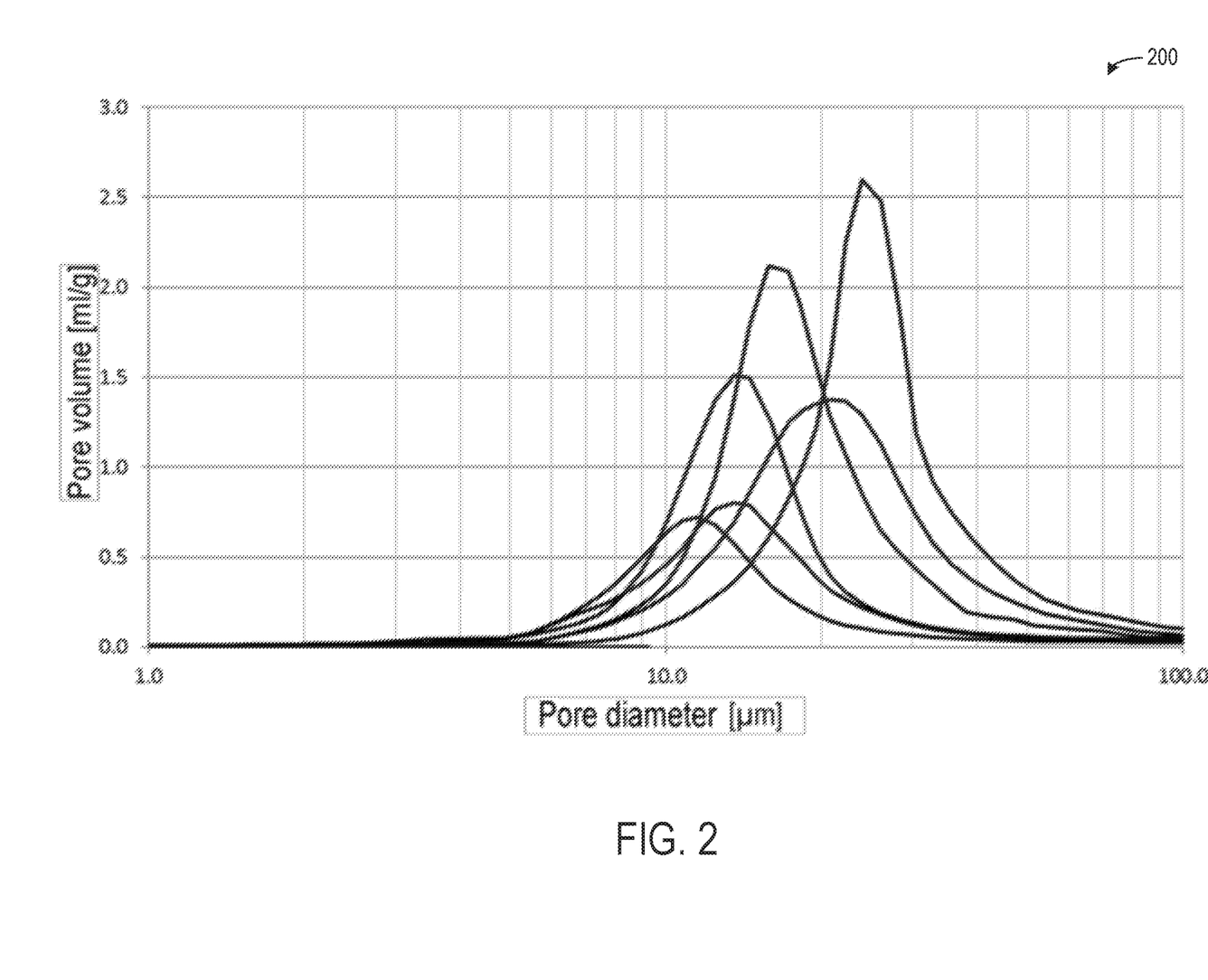
FIG. 2 shows example pore size distributions of previous examples of particulate filters.
Figure 4:
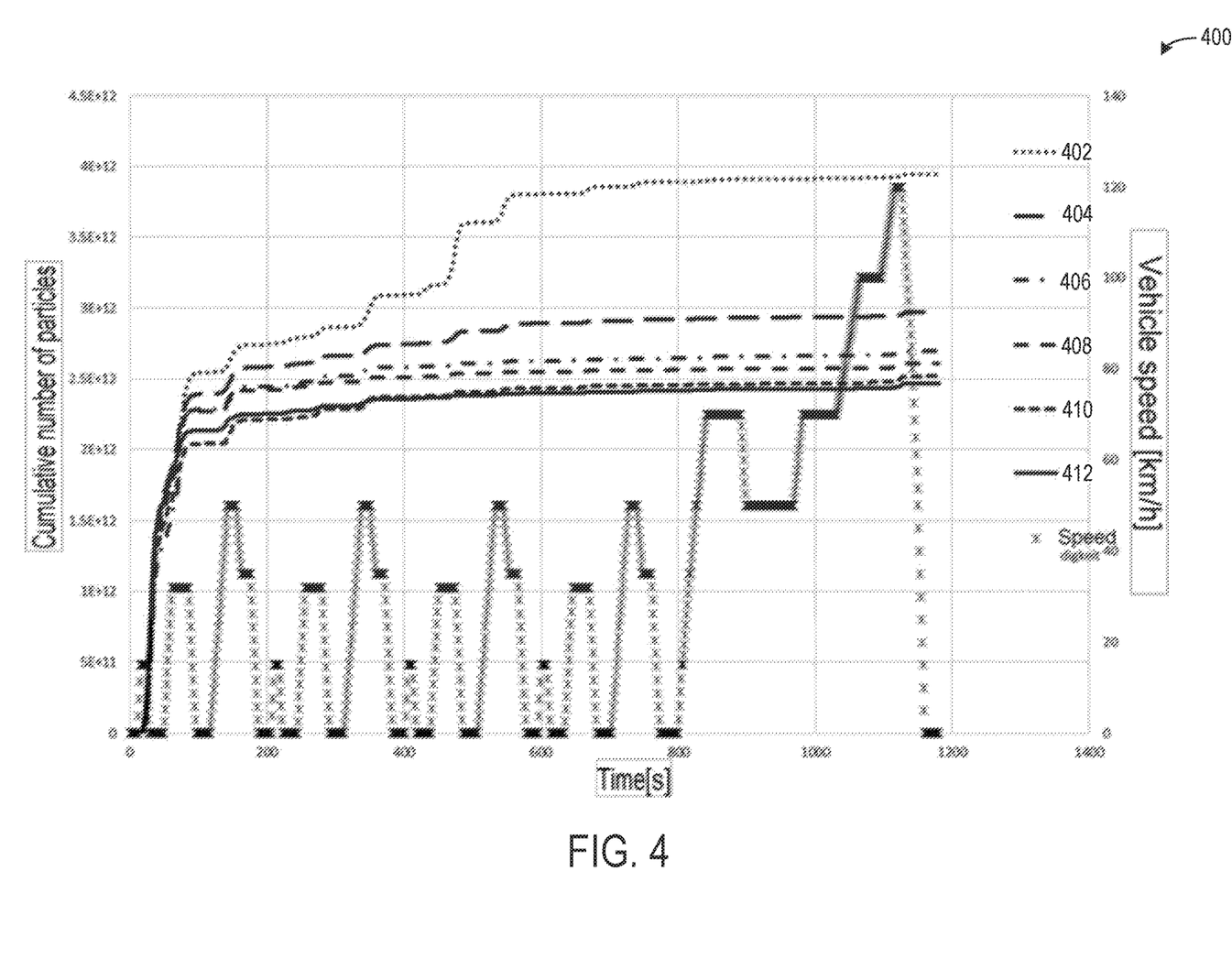
FIG. 4 shows a number of particles released in successive tests.
Figure 5:
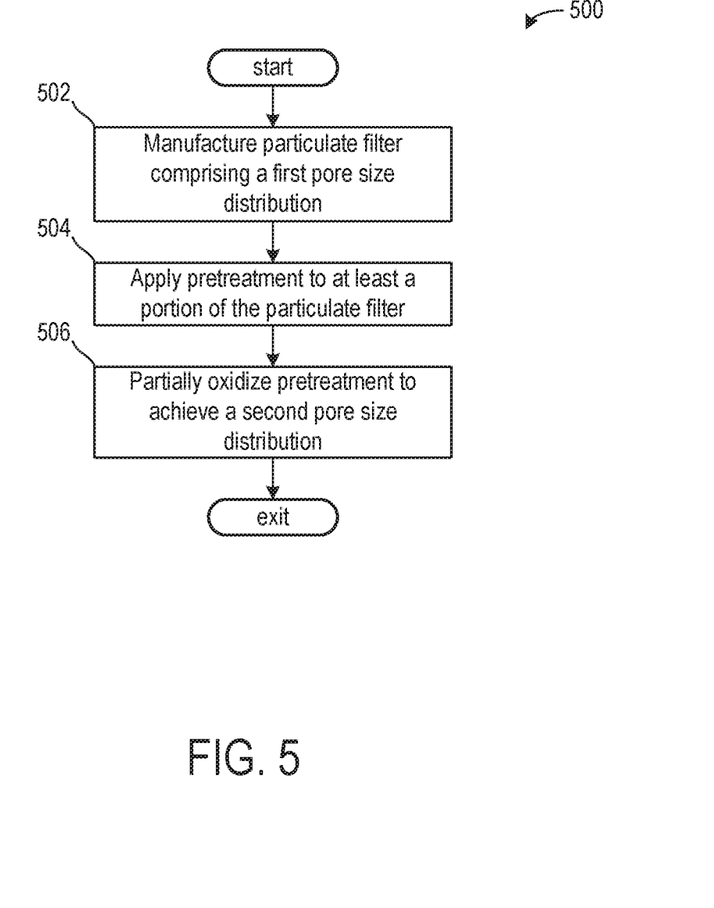
FIG. 5 shows a method for conditioning the particulate filter to decrease the breaking-in period.
Figure 6:
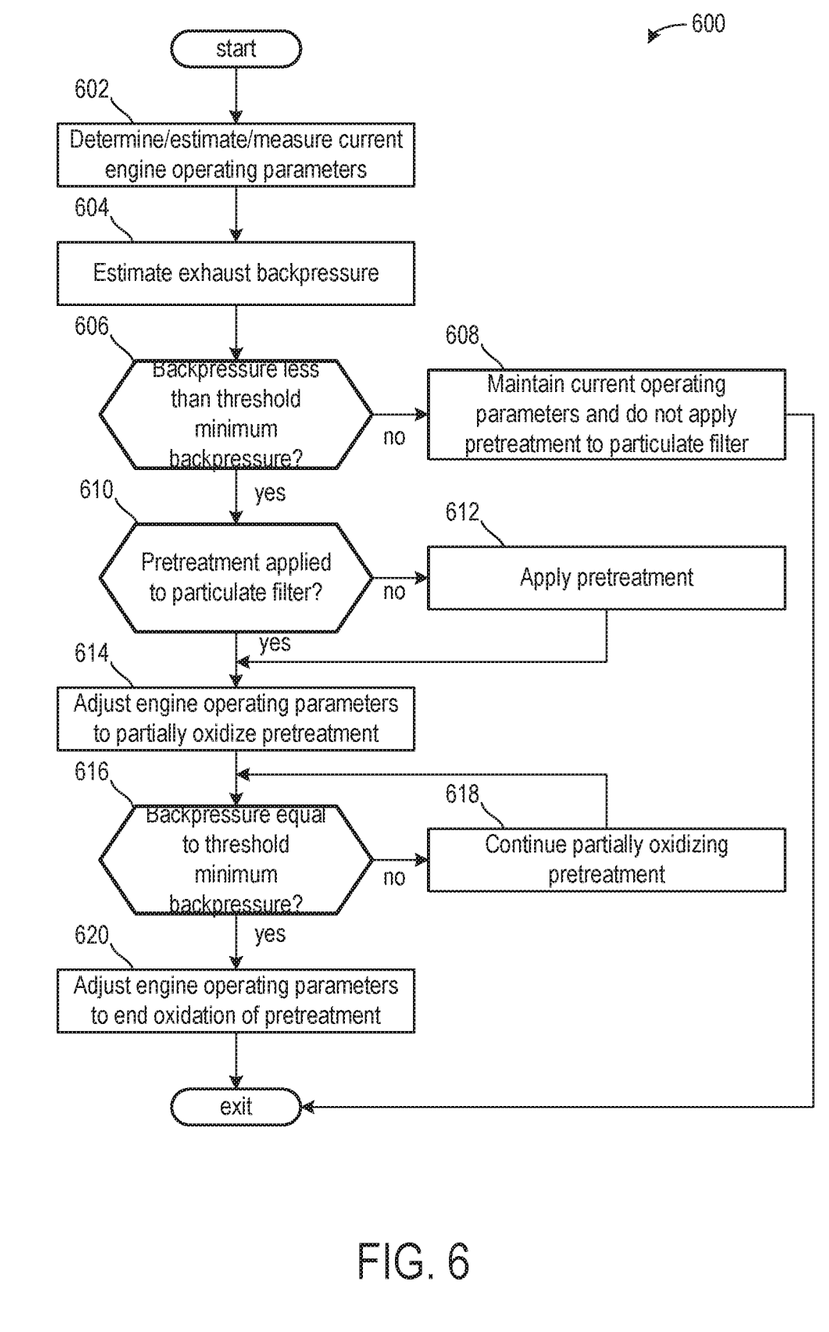
FIG. 6 shows a method for an onboard administration of the pretreatment and partial oxidation of the pretreatment in response to a sensed exhaust backpressure.

FIG. 1 further illustrates a particulate filter arranged in an exhaust passage of the vehicle, wherein the particulate filter may be conditioned to capture a soot. The particulate filter may be characterized by the plot of FIG. 3, which illustrates the increased efficiency of the optimally sized and conditioned particulate filter arranged in the vehicle of FIG. 1. An efficiency of a previous example of a particulate filter utilized in other vehicles is shown in the plot of FIG. 2 for reference. FIG. 4 illustrates a number of particles released in successive emission tests. A method for conditioning the particulate filter arranged in the exhaust system of the engine of the vehicle of FIG. 1 is shown in FIG. 5. The method may aim to decrease a breaking-in period associated with previous example of particulate filters. A method for forming a soot layer on the particulate filter arranged on the vehicle in response to a backpressure is shown in FIG. 6.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, particulate filter, various other emission control devices, or combinations thereof. Herein, emission control device 178 is a particulate filter shaped to capture soot from an exhaust gas flow. The particulate filter 178 may be porous and comprise one or more materials for capturing soot. In some examples, the particulate filter 178 may be treated with a pretreatment prior to being arranged in the exhaust passage 148. Additionally or alternatively, injector 179 may be positioned to inject pretreatment onto or into the particulate filter 178 in response to exhaust backpressure. In the example of FIG. 1, the injector 179 is positioned to inject into the exhaust passage 148 upstream of the particulate filter 178.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller.

Turning now to FIG. 2, it shows a plot 200 illustrating pore size distributions of previous examples of particulate filters without hydrocarbon-containing composition pretreatment. The distributions result from the production process and may not be adjusted at will. That is to say, the previous examples of particulate filters may experience variations in pore size, which may result in a lengthened breaking-in period along with increased emissions.

Figure 3:
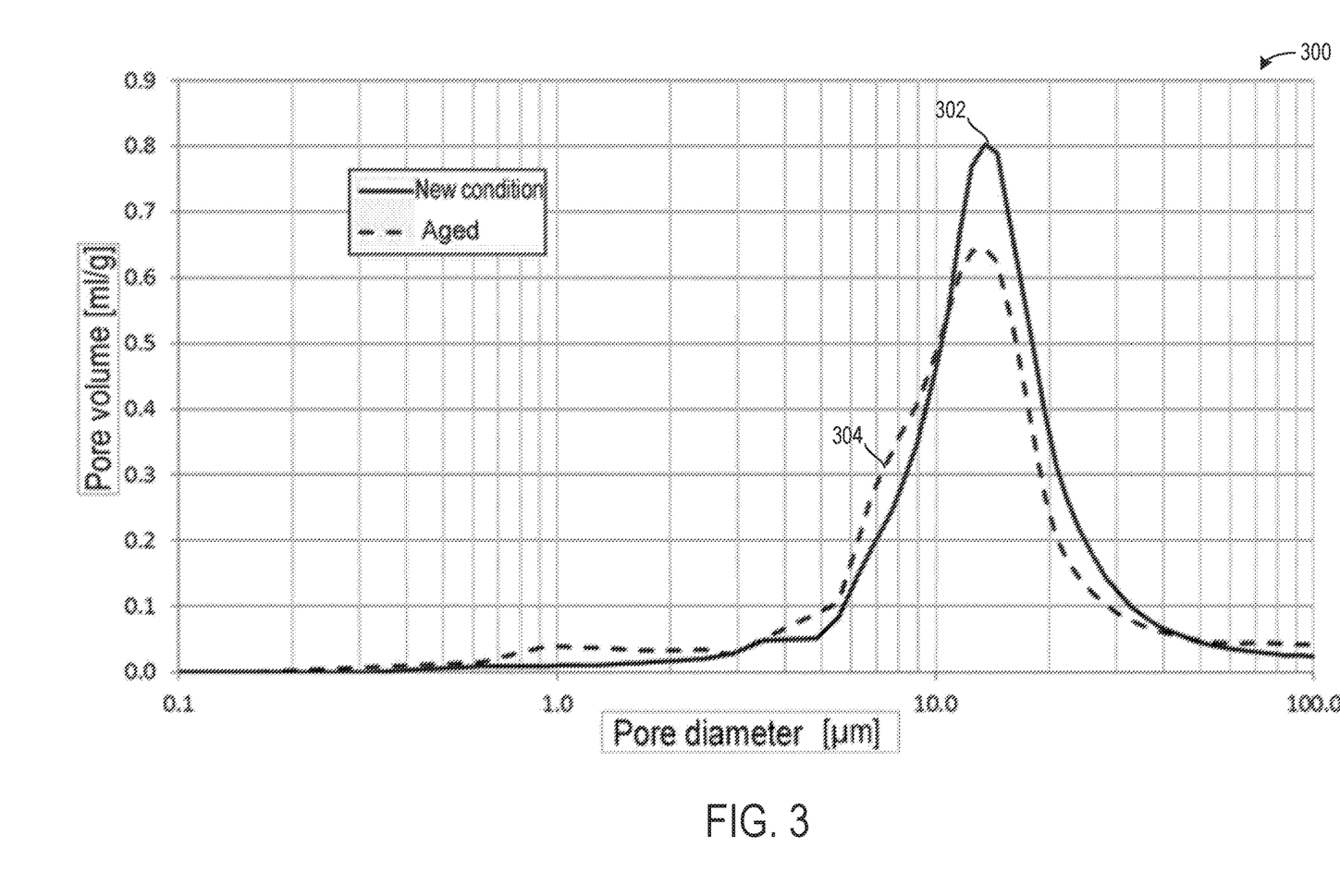
FIG. 3 shows example pore size distributions of a present example of a particulate filter.

Turning now to FIG. 3, it shows a plot 300 illustrating the changes in pore size distribution after intended use of the particulate filter (aged) in comparison with the new state. Use of the particulate filter reduces the frequency of the large pores, which is the primary cause of a poor filtration effect. In other words, the filter efficiency of the aged filter is distinctly better than in the new state. The pore size distribution of the aged particulate filter cannot, however, be directly established during production.

Said another way, the new condition graph (solid line 302) illustrates a pore size for a particulate filter comprising the pretreatment having the hydrocarbon-containing composition. However, the partial oxidation has not yet occurred and a soot layer has not yet formed. The aged condition graph (dashed line 304) illustrates a reduction in pore size such that pore size distribution is more evenly distributed. Furthermore, the reduction in pore size may result in increased particulate filter efficiency as more soot may be captured. Thus, not only does the pretreatment having the hydrocarbon-containing composition decrease a breaking-in period, but the pretreatment may be applied to at least a portion of the surface of the particulate filter to generate a more uniform pore size distribution compared to the previous example shown in FIG. 2. More uniform pore size distribution may result in backpressure remaining under a threshold backpressure such that engine operating parameters may not be impacted as a result of the backpressure while increasing the particulate filter efficiency.

Turning now to FIG. 4, it shows plot 400 illustrating the results of six successive tests which illustrate the improvement in filter efficiency during intended use of the particulate filter, in which the particulate filter was used in an exhaust gas line of an internal combustion engine of a vehicle, such as vehicle 5 of FIG. 1, for filtering out particles from an internal combustion engine exhaust gas stream flowing in the exhaust gas line. Vehicle speed was varied over time during the tests and the cumulative number of particles which were not filtered out, i.e. which are detectable downstream of the particulate filter in the exhaust gas line, was determined.

It is apparent that the cumulative number of released particles declines from the first test 402, to the second test 404, to the third test 406, to the fourth test 408, to the fifth test 410, and to the sixth test 412. According to the disclosure, in order to enable sufficient filter performance right from initial startup (corresponding to test 1, plot 402), a pretreatment having a hydrocarbon-containing composition was applied onto the surface of the particulate filter before first use of the particulate filter and soot is formed on the surface of the particulate filter via incomplete oxidation of the hydrocarbon-containing composition. The soot is here formed in such a way that the soot-loaded particulate filter has an optimum pore size distribution before first use, thus for example the "aged" pore size distribution according to FIG. 3 which was determined in advance.

It will be appreciated by those of ordinary skill in the art that arranging a used particulate filter from a vehicle in the exhaust passage of a vehicle may not provide the same benefits of the particulate filter treated with the pretreatment having the hydrocarbon-containing composition. For example, a pore size distribution of the used particulate may not be tailored similarly to the unused particulate filter receiving the pretreatment. Furthermore, obtaining used particulate filters may be expensive and unreliable, as the used particulate filters will be different due to different previous driving conditions and the like. As such, the pretreatment offers a cheap, reliable way to reduce the breaking-in period for new, unused particulate filters.

Turning now to FIG. 5 it shows a method 500 for applying a pretreatment to an unused particulate filter and at least partially oxidizing the pretreatment, wherein the unused particulate filter is free of soot. The method 500 may be executed onboard a vehicle during an inaugural firing of the vehicle or may be executed off-board the vehicle by a factory worker or the like. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 500 begins at 502, which includes manufacturing a particulate filter comprising a first pore size distribution. In one example, the first pore size distribution may be substantially similar to the pore size distribution illustrated in new condition plot 302 of FIG. 3. As described above, the particulate filter may be a flow-through or wall type particulate filter comprising one or more catalysts and/or other compounds for capturing and/or treating vehicle emissions.

In some examples, the first pore size distribution is a distribution where a majority of the pores are sized above a desired operating size. The desired operating size may be based on an optimal pore size for capturing soot from the exhaust gas. That is to say, the majority of the pores may be sized at a larger size, wherein a difference between the larger size and the optimal pore size is substantially equal to an expected size of a soot layer which will form following partial oxidation of a pretreatment applied to the particulate filter.

The method 500 may proceed to 504, which may include applying a pretreatment to at least a portion of the particulate filter. In some examples, the portion may include only a front surface of the particulate filter, wherein the front surface is a surface of the particulate filter that is the first surface to receive exhaust gas. Additionally or alternatively, the pretreatment may be dispersed throughout an entirety of the particulate filter, where the dispersion may be random or calculated, wherein the calculation is based on a soot layer formation of the pretreatment following a partial oxidation. As described above, the pretreatment may be applied to the particulate filter onboard the vehicle (e.g., after the particulate filter is arranged in an exhaust passage) or off-board prior to the particulate filter being arranged in the exhaust passage. If the pretreatment is applied onboard, then the controller may signal to an actuator of an injector prior to an inaugural firing of the engine or during the inaugural firing to inject the pretreatment toward or into the particulate filter. It will be appreciated that the injector may be a multi-purpose injector and may be positioned to inject other liquids and/or gases into the exhaust passage, including but not limited to reductants for regenerating aftertreatment devices. If applied off-board, the pretreatment may be applied during the manufacturing of the particulate filter or after the particulate filter is completely constructed. If applied during the manufacturing, then the pretreatment may be applied over a catalytic layer of the particulate filter.

In some examples, additionally or alternatively, the method may additionally include injecting the pretreatment during vehicle conditions outside of the inaugural and/or first firing. This may occur if a soot layer already present on the particulate filter is completely or overly oxidized such that the soot layer is less than a threshold soot layer. The soot layer may be less than the threshold soot layer if an exhaust backpressure is less than a lower threshold backpressure. That is to say, if exhaust backpressure is not high enough, then the soot layer on the particulate filter may be too low and the particulate filter efficiency may be less than a desired efficiency. In response, the injector may be activated to inject the pretreatment. Over oxidation may occur if a regeneration, whether passive or active, goes uncontrolled. In some examples, over oxidation may further include degradation of the particulate filter, where regeneration temperatures are high due to the excess oxygen, which may result in cracks or leaks. In some examples, the pretreatment may be applied to decrease a size of the crack or leak, thereby decreasing emissions from a degraded particulate filter.

The method 500 may proceed to 506, which may include partially oxidizing the pretreatment to achieve a second pore size distribution. In one example, the second pore size distribution is substantially similar to the aged pore size distribution 304 of FIG. 3. The second pore size distribution may be more evenly distributed than the first pore size distribution. In one example, the second pore size distribution may include more small pore sizes and fewer large pore sizes than the first pore size distribution. This may be a result of the partial oxidation of the pretreatment forming one or more soot layers which may at least partially constrict the pores of the particulate filter. In one example, the majority of the pores may be sized equally to the optimal pore size due to a constriction of the pores from the formation of the soot layer.

The partial oxidation may take place during the inaugural and/or first firing. The first firing may be defined as a first firing of an engine subsequent arranging the particulate filter in an exhaust gas shaped to receive exhaust gas of the engine. As such, engine operating conditions may be adjusted during the first firing to achieve an air/fuel ratio at or above stoichiometric such that partial oxidation may occur. Once an exhaust backpressure is substantially equal to a threshold minimum backpressure, then the partial oxidation may be terminated. Terminating the partial oxidation may include decreasing the air/fuel ratio to at or below stoichiometric to decrease the flow of oxygen to the particulate filter. The threshold minimum backpressure may be equal to a backpressure sensed by a pressure sensor when a particulate filter comprises a desired soot layer amount for increasing its efficiency to a desired efficiency.

Turning now to FIG. 6, it shows a method 600 for an onboard administration of the pretreatment and partial oxidation of the pretreatment in response to a sensed exhaust backpressure. The method 600 begins at 602, which includes determining, estimating, and/or measuring current engine operating parameters. Current engine operating parameters may include, but are not limited to, one or more of engine temperature, engine speed, manifold vacuum, exhaust-gas recirculation flow rate, and air/fuel ratio.

The method 600 may proceed to 604, which may include estimating an exhaust backpressure. In one example, feedback from exhaust gas sensor 128 of FIG. 1 may be used to estimate the exhaust backpressure.

The method 600 may proceed to 606, which may include determining if the exhaust backpressure is less than a threshold minimum backpressure. As described above, the threshold minimum backpressure may correspond to a backpressure generated by a particulate filter comprising a desired soot layer, wherein the desired soot layer increases an efficiency of the particulate filter to a desired efficiency. The desired efficiency may be equal to an efficiency of the particulate filter following a breaking-in period.

If the backpressure is not less than the threshold minimum backpressure, then the method 600 may proceed to 608 to maintain current operating parameters and does not apply a pretreatment to the particulate filter. Additionally or alternatively, the air/fuel ratio may not be adjusted to at least partially oxidize a pretreatment on the particulate filter.

If the backpressure is less than the threshold minimum backpressure, then the method 600 may proceed to 610 to determine if a pretreatment is already applied to the particulate filter. If the vehicle is equipped with an injector positioned to inject pretreatment onto and/or into the particulate filter, then the method may determine if pretreatment was applied recently (e.g., within a distance or within a time duration). Data may be stored in and gathered from a look-up table. For example, if pretreatment was applied to the particulate filter 10 miles ago, then it may be determined that pretreatment is already applied to the particulate filter. However, if pretreatment was applied to the particulate filter 1,000 miles ago, then it may be determined that pretreatment is to be applied to the particulate filter.

If it is determined that pretreatment was not recently applied to the particulate filter, then the method 600 may proceed to 612 to apply the pretreatment. This may include signaling to an actuator of an injector to inject pretreatment. In one example, the controller 12 may signal to an actuator of the injector 179 to inject an amount of pretreatment into the exhaust passage 148 of FIG. 1. In one example, the amount of pretreatment injected may be proportional to a difference between the threshold minimum backpressure and the sensed backpressure, wherein the amount increases as the difference increases. In some examples, additionally or alternatively, the amount may be fixed.

The method 600 may proceed to 614 following 610 or 612, which may include adjusting engine operating parameters to partially oxidize the pretreatment. Partial oxidation of the pretreatment may include oxidizing the pretreatment, which comprising a hydrocarbon-containing composition, such that a soot layer forms. Partial oxidation may be performed via flowing an excess of air to the particulate filter, which may include stoichiometric and/or lean air/fuel ratios and/or flowing air directly into the exhaust passage via a valve or the like. Over-oxidation may be undesired as this may decrease an amount of the soot layer formed, thereby decreasing the efficiency of the particulate filter. As such, the exhaust backpressure may fall below the threshold minimum backpressure due to over-oxidation and/or over-regeneration of the particulate filter, which may result from extended lean operation of the engine. The soot layer may increase efficiency of the particulate filter by decreasing a pore size of the particulate filter pores to a desired size, while additionally attracting soot from the exhaust gas flow.

The method 600 may proceed to 616, which may include determining if the backpressure is equal to the threshold minimum backpressure. Once the backpressure is substantially equal to the threshold minimum backpressure, the partial oxidation may be complete the soot layer may be equal to a desired amount. If the backpressure is not equal to the threshold minimum backpressure, then the method 600 may proceed to 618 to continue partially oxidizing the pretreatment to continue forming the soot layer. If the backpressure is substantially equal to the threshold minimum backpressure, then the method 600 may proceed to 620 to adjust engine operating parameters to end oxidation of the pretreatment. This may include decreasing an air/fuel ratio or adjusting other conditions to decrease air flow to the particulate filter. By doing this, the soot layer may remain intact, resulting in an optimal pore size of the particulate filter, increased efficiency capturing soot and particulates from the exhaust gas, and a decreased breaking-in period relative to previous examples.

In this way, a breaking-in period for a particulate filter may be reduced by applying a pretreatment thereto. The pretreatment may be applied before the particulate filter is arranged in an exhaust passage of a vehicle or after. The pretreatment may comprise a hydrocarbon-containing composition, which may form a soot layer upon partial oxidation. The technical effect of applying the pretreatment to the particulate filter is to decrease the breaking-in period, which may decrease emissions. The pretreatment may further provide a reliable way of maintaining a particulate filter at at least a desired soot layer so that particulate filter efficiency does not drop below a desired efficiency.

A method comprising manufacturing a particulate filter, applying a hydrocarbon-containing composition onto at least a portion of the particulate filter, arranging the particulate filter in an exhaust passage of a vehicle and adjusting engine operating parameters during a first combustion of an engine of the vehicle to incompletely oxidize the hydrocarbon-containing composition. A first example of the method further includes where the incomplete oxidation includes an air/fuel ratio of greater than or equal to stoichiometric. A second example of the method, optionally including the first example, further includes where a duration of the incomplete oxidation is terminated in response to a backpressure being equal to at least a threshold minimum backpressure. A third example of the method, optionally including the first and/or second examples further includes where terminating the incomplete oxidation includes decreasing the air/fuel ratio to at least slightly below stoichiometric. A fourth example of the method, optionally including one or more of the first through third examples, further includes where pores of the particulate filter are slightly oversized relative to a desired operating pore size in anticipation of the hydrocarbon-containing composition being incompletely oxidized. A fifth example of the method, optionally including one or more of the first through fourth examples, further includes where the carbon-containing composition is a synthetic resin. A sixth example of the method, optionally including one or more of the first through fifth examples, further includes where the particulate filter is a diesel particulate filter or a spark-ignition fuel particulate filter.

A method for pretreating a particulate filter comprising applying a pretreatment comprising a hydrocarbon-containing composition to a portion of a particulate filter in response to an exhaust backpressure being less than a threshold minimum backpressure. A first example of the method further includes where the threshold minimum backpressure is equal to a backpressure generated by a minimum desired soot layer arranged on the particulate filter. A second example of the method, optionally including the first example, further includes where the pretreatment is applied to an unused particulate filter, wherein the unused particulate filter has not filtered exhaust gas, and where the pretreatment is applied over a catalytic coating of the unused particulate filter. A third example of the method, optionally including the first and/or second examples, further includes where the pretreatment is applied to the unused particulate filter in or outside of an exhaust passage of a vehicle. A fourth example of the method, optionally including one or more of the first through third examples, further includes where an injector is positioned to inject the pretreatment into an exhaust passage or directly into a particulate filter housing, wherein the injector injects the pretreatment during a first combustion of an engine following installing the particulate filter into an exhaust passage shaped to receive exhaust gas from the engine. A fifth example of the method, optionally including one or more of the first through fourth examples, further includes where the injector is shaped to additionally inject fluids different than the pretreatment, including one or more of water, urea, and fuel. A sixth example of the method, optionally including one or more of the first through fifth examples, further includes where sizing a plurality of pores of the particulate filter to a size greater than a desired pore size, wherein the desired pore size is based on an optimal size of the plurality of pores to capture particulates in an exhaust gas flow. A seventh example of the method, optionally including one or more of the first through sixth examples, further includes where the pretreatment is partially oxidized when the particulate filter first receives exhaust gas.

A system comprising a particulate filter treated with a pretreatment comprising a pore size greater than a desired pore size, and where the particulate filter is free of soot and arranged in an exhaust passage shaped to receive exhaust gas from an engine and a controller with computer-readable instructions stored on non-transitory memory thereof that when executed enable the controller to increase an air/fuel ratio upon a first ignition of the engine to partially oxidize the pretreatment and decrease the air/fuel ratio upon an exhaust backpressure being equal to a threshold minimum backpressure. A first example of the system further includes where the pretreatment is a synthetic resin comprising a hydrocarbon-containing composition. A second example of the system, optionally including the first example, further includes where the pore size is equal to the desired pore size in response to the exhaust backpressure being equal to the threshold minimum backpressure. A third example of the system, optionally including the first and/or second examples, further includes where the particulate filter is treated with the pretreatment before or after the particulate filter is arranged in the exhaust passage. A fourth example of the system, optionally including one or more of the first through third examples, further includes where partially oxidizing the pretreatment further includes forming a soot layer on at least a portion of the particulate filter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   manufacturing a particulate filter;
   applying a hydrocarbon-containing composition onto at least a portion of the particulate filter;
   arranging the particulate filter in an exhaust passage of a vehicle; and
   adjusting engine operating parameters during a first combustion of an engine of the vehicle to incompletely oxidize the hydrocarbon-containing composition wherein the incomplete oxidation includes an air/fuel ratio of greater than or equal to stoichiometric.

2. The method of claim 1, wherein a duration of the incomplete oxidation is terminated in response to a backpressure being equal to at least a threshold minimum backpressure.

3. The method of claim 2, wherein terminating the incomplete oxidation includes decreasing the air/fuel ratio to at least slightly below stoichiometric.

4. The method of claim 1, wherein pores of the particulate filter are slightly oversized relative to a desired operating pore size in anticipation of the hydrocarbon-containing composition being incompletely oxidized.

5. The method of claim 1, wherein the carbon-containing composition is a synthetic resin.

6. The method of claim 1, wherein the particulate filter is a diesel particulate filter or a spark-ignition fuel particulate filter.

7. A method for pretreating a particulate filter comprising:
applying a pretreatment comprising a hydrocarbon-containing composition to a portion of a particulate filter in response to an exhaust backpressure being less than a threshold minimum backpressure;
wherein the pretreatment is partially oxidized by adjusting air/fuel ratio when the particulate filter first receives exhaust gas.

8. The method of claim 7, wherein the threshold minimum backpressure is equal to a backpressure generated by a minimum desired soot layer arranged on the particulate filter.

9. The method of claim 7, wherein the pretreatment is applied to an unused particulate filter, wherein the unused particulate filter has not filtered exhaust gas, and where the pretreatment is applied over a catalytic coating of the unused particulate filter.

10. The method of claim 9, wherein the pretreatment is applied to the unused particulate filter in or outside of an exhaust passage of a vehicle.

11. The method of claim 7, wherein an injector is positioned to inject the pretreatment into an exhaust passage or directly into a particulate filter housing, wherein the injector injects the pretreatment during a first combustion of an engine following installing the particulate filter into an exhaust passage shaped to receive exhaust gas from the engine.

12. The method of claim 11, wherein the injector is shaped to additionally inject fluids different than the pretreatment, including one or more of water, urea, and fuel.

13. The method of claim 7, further comprising sizing a plurality of pores of the particulate filter to a size greater than a desired pore size, wherein the desired pore size is based on an optimal size of the plurality of pores to capture particulates in an exhaust gas flow.

14. A system comprising:
a particulate filter treated with a pretreatment comprising a pore size greater than a desired pore size, and where the particulate filter is free of soot and arranged in an exhaust passage shaped to receive exhaust gas from an engine; and
a controller with computer-readable instructions stored on non-transitory memory thereof that when executed enable the controller to:
increase an air/fuel ratio upon a first ignition of the engine to partially oxidize the pretreatment;
decrease the air/fuel ratio upon an exhaust backpressure being equal to a threshold minimum backpressure.

15. The system of claim 14, wherein the pretreatment is a synthetic resin comprising a hydrocarbon-containing composition.

16. The system of claim 14, wherein the pore size is equal to the desired pore size in response to the exhaust backpressure being equal to the threshold minimum backpressure.

17. The system of claim 14, wherein the particulate filter is treated with the pretreatment before or after the particulate filter is arranged in the exhaust passage.

18. The system of claim 14, wherein partially oxidizing the pretreatment further includes forming a soot layer on at least a portion of the particulate filter.

* * * * *